United States Patent
Yang et al.

(10) Patent No.: US 11,349,658 B2
(45) Date of Patent: May 31, 2022

(54) BLOCKCHAIN DATA PROCESSING METHOD, APPARATUS, AND DEVICE

(71) Applicant: Alipay (Hangzhou) Information Technology Co., Ltd., Zhejiang (CN)

(72) Inventors: Wenyu Yang, Zhejiang (CN); Honglin Qiu, Zhejiang (CN); Ying Yan, Zhejiang (CN); Shubo Li, Zhejiang (CN); Yuan Chen, Zhejiang (CN); Hanghang Wu, Zhejiang (CN); Renhui Yang, Zhejiang (CN); Qin Liu, Zhejiang (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 17/361,982

(22) Filed: Jun. 29, 2021

(65) Prior Publication Data

US 2022/0038279 A1 Feb. 3, 2022

(30) Foreign Application Priority Data

Jul. 31, 2020 (CN) .......................... 202010757367.3

(51) Int. Cl.
*H04L 9/32* (2006.01)
(52) U.S. Cl.
CPC ...................................... *H04L 9/32* (2013.01)
(58) Field of Classification Search
CPC ...... H04L 9/32; H04L 2209/38; H04L 9/3239
See application file for complete search history.

(56) References Cited

U.S. PATENT DOCUMENTS

| | | | |
|---|---|---|---|
| 2013/0044224 A1* | 2/2013 | Liao | H04N 19/46 |
| | | | 348/192 |
| 2018/0205743 A1* | 7/2018 | McIver | H04L 9/14 |
| 2018/0227119 A1* | 8/2018 | Bibera | H04L 63/083 |
| 2018/0227275 A1* | 8/2018 | Russinovich | H04L 63/104 |
| 2019/0103958 A1* | 4/2019 | Wu | G06F 21/64 |

(Continued)

FOREIGN PATENT DOCUMENTS

| | | |
|---|---|---|
| CN | 110580417 A | 12/2019 |
| CN | 110888938 A | 3/2020 |

(Continued)

OTHER PUBLICATIONS

First Office Action of Chinese Application No. 202010757367.3, dated Oct. 15, 2020.

(Continued)

*Primary Examiner* — Abiy Getachew
(74) *Attorney, Agent, or Firm* — Finnegan, Henderson, Farabow, Garrett & Dunner, LLP

(57) ABSTRACT

A blockchain data processing method includes: receiving a read request for target data stored in a blockchain; acquiring read permission index information of the target data from the blockchain, and acquiring a data read rule corresponding to the target data based on the read permission index information, the data read rule being configured to determine readable content in the target data; determining, in a predetermined trusted environment, the readable content in the target data based on the data read rule; and providing the readable content in the target data for a sender of the read request.

13 Claims, 4 Drawing Sheets

(56) References Cited

U.S. PATENT DOCUMENTS

2020/0034311 A1* 1/2020 Wang ................. G06F 16/1827
2021/0312088 A1* 10/2021 Choi ....................... H04L 9/088

FOREIGN PATENT DOCUMENTS

| CN | 111475849 A | 7/2020 |
| CN | 111475850 A | 7/2020 |
| EP | 2 821 924 A1 | 1/2015 |
| WO | WO 2020/103566 A1 | 5/2020 |
| WO | WO 2020/143620 A1 | 7/2020 |

OTHER PUBLICATIONS

Extended European Search Report in European Application No. 21181196.3, dated Dec. 8, 2021.

* cited by examiner

US 11,349,658 B2

BLOCKCHAIN DATA PROCESSING METHOD, APPARATUS, AND DEVICE

CROSS-REFERENCE TO RELATED APPLICATIONS

The present application is based upon and claims priority to Chinese Patent Application No. 202010757367.3, filed on Jul. 31, 2020, the entire content of which is incorporated herein by reference.

TECHNICAL FIELD

The present specification relates to the field of computer technologies, and in particular, to a blockchain data processing method, apparatus, and device.

BACKGROUND

Blockchains have been well applied to anti-tampering, anti-counterfeiting, and traceability of online data. In order to ensure the integrity of data and prevent tampering, the data can be uploaded to a blockchain for storage and verification.

If relevant data in a certain service (such as a payment service, a logistics service, and a fundraising and funding service) is added to the blockchain, the data cannot be changed and repudiated. However, when the data uploaded to the blockchain is read, it is not determined whether the content of the data is compliant. How to perform compliance verification on the data stored in the blockchain before reading becomes an important issue to be solved. Therefore, there is a need to provide a technical solution for performing compliance verification on the data stored in the blockchain before reading.

SUMMARY

According to a first aspect of embodiments of the present specification, a blockchain data processing method includes: receiving a read request for target data stored in a blockchain; acquiring read permission index information of the target data from the blockchain, and acquiring a data read rule corresponding to the target data based on the read permission index information, the data read rule being configured to determine readable content in the target data; determining, in a predetermined trusted environment, the readable content in the target data based on the data read rule; and providing the readable content in the target data for a sender of the read request.

According to a second aspect of embodiments of the present specification, a blockchain data processing device includes: a processor; and a memory storing instructions executable by the processor, wherein the processor is configured to: receive a read request for target data stored in a blockchain; acquire read permission index information of the target data from the blockchain, and acquire a data read rule corresponding to the target data based on the read permission index information, the data read rule being configured to determine readable content in the target data; determine, in a predetermined trusted environment, the readable content in the target data based on the data read rule; and provide the readable content in the target data for a sender of the read request.

According to a third aspect of embodiments of the present specification, a non-transitory computer-readable storage medium has stored therein instructions that, when executed by a processor of a device, cause the device to perform a blockchain-based data processing method, the method including: receiving a read request for target data stored in a blockchain; acquiring read permission index information of the target data from the blockchain, and acquiring a data read rule corresponding to the target data based on the read permission index information, the data read rule being configured to determine readable content in the target data; determining, in a predetermined trusted environment, the readable content in the target data based on the data read rule; and providing the readable content in the target data for a sender of the read request.

BRIEF DESCRIPTION OF THE DRAWINGS

The accompanying drawings, which are incorporated in and constitute a part of this specification, illustrate embodiments and, together with the description, serve to explain the principles of the specification.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The described embodiments are merely examples of rather than all the embodiments of the present specification.

Figure 1:
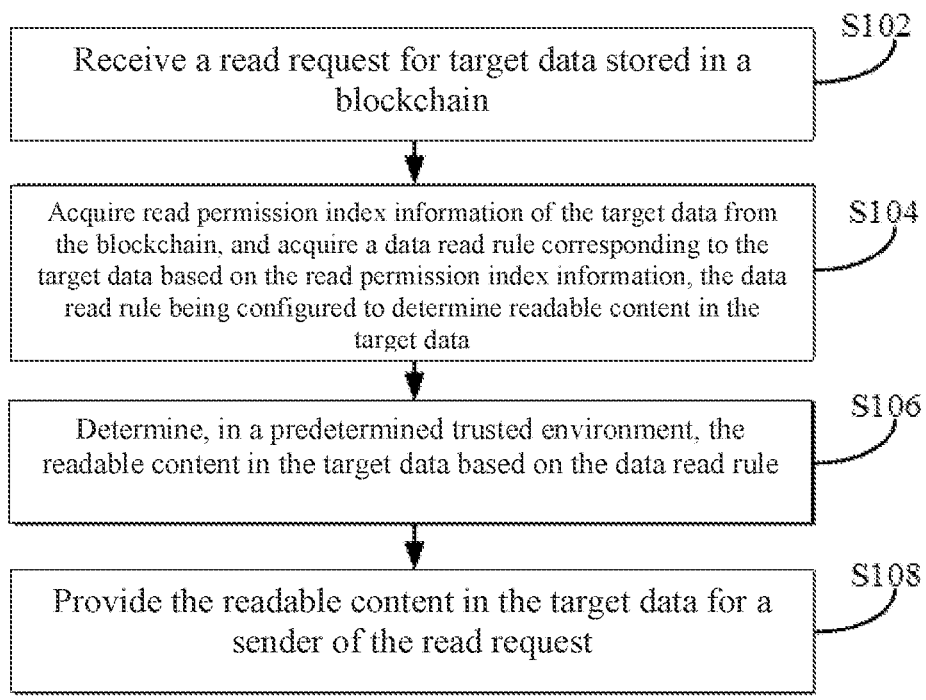
FIG. 1 is a flowchart of a blockchain data processing method according to an embodiment.

FIG. 1 is a flowchart of a blockchain data processing method according to an embodiment. The method may be executed by a terminal device or a server. The terminal device may be a computer device such as a notebook computer or a desktop computer. The server may be a stand-alone server, or a server cluster formed by a plurality of servers, or the like. The terminal device or server may be configured to detect whether data that has been uploaded to a blockchain can be read by a user and perform processing. The terminal device or server may be provided with a trusted execution environment. The trusted execution environment may be a Trusted Execution Environment (TEE), and the trusted execution environment may be implemented based on a hardware device, or implemented through a program written in a predetermined programming language (that is, it may be implemented in the form of software). The method being executed by a server is taken as an example in the embodiment of the present specification. In a case where the method is executed by a terminal device, the method may be performed with reference to the following related content. The method may include the following steps.

In step S102, a read request for target data stored in a blockchain is received.

The blockchain may be any public blockchain, private blockchain, consortium blockchain, or the like. Specified data may be stored in the blockchain, and the data in the blockchain has the advantages of anti-tampering and traceability. The target data may be any data, such as transaction data generated by a user in an online transaction process, personal credit data of a user, or data of resources such as a text provided by a user or organization, or the like.

In an embodiment, a blockchain has been well applied to anti-tampering, anti-counterfeiting, and traceability of online data. If a certain piece of data is added to the blockchain, the data will not be able to be changed and repudiated. Generally, a service organization that provides a certain piece of data for a user needs to perform compliance verification on content of the data requested by the user before providing the data for the user. Compliance verification may be verification on whether data to be read includes data that does not conform to laws and regulations, regulatory regulations or rules, or relevant standards or rules and regulations formulated by a specified organization or institution. Since the laws and regulations, regulatory regulations or rules, or relevant standards or rules and regulations formulated by the specified organization or institution are subject to constant changes, the above compliance verification is dynamically changed (that is, the laws and regulations, regulatory regulations or rules, or relevant standards or rules and regulations formulated by the specified organization or institution used in previous compliance verification may be different from those used in this compliance verification). In this way, there may be two contradictory mechanisms, that is, the data uploaded to the blockchain cannot be changed and the compliance verification on the data is dynamically changed. Therefore, there is a need to provide a compliance verification process for the data stored on the blockchain before it is read.

Figure 2:
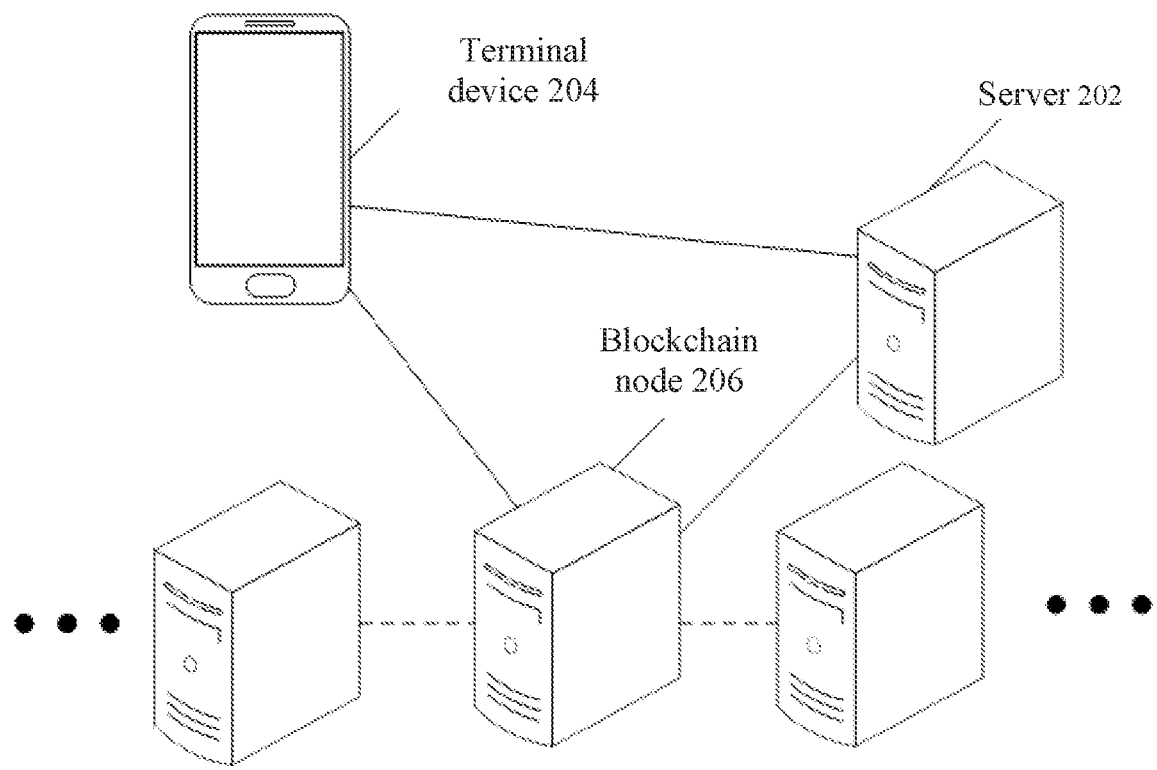
FIG. 2 is a schematic diagram of a blockchain data processing system according an embodiment.

FIG. 2 is a schematic diagram of a blockchain data processing system according an embodiment. As shown in FIG. 2, to perform compliance verification on data to be read (i.e., target data) in the blockchain, a server 202 that performs compliance verification on the target data may be preset, and an application program that performs the compliance verification function may be installed in the server. Correspondingly, an application program that reads data in the blockchain may also be installed in a terminal device 204 of the user. Through the application program, the user can request reading a certain piece of data from the blockchain. To this end, a data read entry (such as a key or a hyperlink for data reading) may be set in the application program. If the user needs to read a certain piece of data (e.g., the target data) in the blockchain, the user may send a read request to the server 202 through the data read entry. For example, the user may click a key or hyperlink for data reading corresponding to the target data, and the terminal device 204 may acquire relevant information such as an identifier of the target data (such as a name or code of the target data) and may generate a read request accordingly and send the read request to the server 202. The server 202 may receive the read request for the target data stored in the blockchain.

In the above embodiment, the method is implemented by the terminal device 204 directly sending a read request for the target data to the server 204. In some embodiments, the terminal device 204 may send the read request to a blockchain node 206, and the blockchain node 206 may send a redirection message to the terminal device 204. The redirection message may include an access address (such as an IP address) of the server 202. The terminal device 204 may send the read request to the server 202 based on the access address in the redirection message. The server 202 may receive the read request for the target data stored in the blockchain.

In step S104, read permission index information of the target data is acquired from the blockchain, and a data read rule corresponding to the target data is acquired based on the read permission index information, the data read rule being configured to determine readable content in the target data.

The read permission index information may be configured to record information such as a position where a data read rule corresponding to a certain piece of data is stored. With the read permission index information, the data read rule corresponding to the corresponding data can be quickly found. After the corresponding data is stored in the blockchain, the read permission index information generally may not modify the content thereof. That is, the storage position of the data read rule corresponding to the data generally does not change to prevent the read permission index information of a certain piece of data from being maliciously tampered with. The data read rule may be configured to detect whether content of a certain piece of data includes content that is forbidden to be read, and may be a rule that filters out readable content for the user. For example, the data read rule includes the content that is forbidden to be read being a mobile phone number, an address, an ID card number, a certain or some specified words, and the like. Each piece of data may correspond to one or more pieces of read permission index information, and each piece of read permission index information may correspond to one or more data read rules.

In an embodiment, in order to ensure the integrity of read permission index information of a certain piece of data and prevent tampering, the read permission index information of the data may be uploaded to the blockchain. In an embodiment, in order to record a data read rule corresponding to a certain piece of data, read permission index information of the data may be preset according to an actual situation. For example, a region where a data read rule corresponding to a certain piece of data can be stored may be preset. Then, after the data is uploaded to the blockchain, read permission index information may be generated based on the preset region. In an embodiment, after a data read rule is generated for the data through a preset data processing mechanism, the server may assign a storage region to the data read rule according to current storage, and then, read permission index information may be generated based on the assigned storage region, or the like. After completion of the setting of the read permission index information, the server may upload the read permission index information to the blockchain.

Through the processing of step S102 described above, after the read request for the target data is acquired, the read request may be analyzed, and relevant information such as an identifier of the target data may be extracted therefrom. The target data needing to be read may be determined based on the extracted information, and read permission index information of the target data may be determined based on the extracted relevant information such as the identifier of the target data. Then, the read permission index information may be acquired from the blockchain. In order to determine readable content in the target data subsequently, after the read permission index information is read, the data read rule may be found from a preset database according to the information recorded in the read permission index information, such as the position where the data read rule corresponding to the target data is stored. The predetermined database may be composed of a storage device or server configured to store predetermined data and outside the blockchain.

In step S106, the readable content in the target data is determined based on the data read rule in a predetermined trusted environment.

The trusted environment may be a trusted execution environment. The trusted execution environment may be implemented by a program written in a predetermined programming language (that is, it may be implemented in the form of software), and the trusted execution environment may be a data processing environment that is safe and isolated from other environments. Processing executed in the trusted execution environment, data generated in a data processing process, and the like cannot be known to any party outside the trusted execution environment.

In an embodiment, in order to ensure that the data in the blockchain is not leaked, the target data may be placed in a trusted execution environment, and then the target data may be calculated or processed in the trusted execution environment, which may include: presetting a data read rule so as to verify the authenticity of the target data. There may be a variety of set data verification rules. For details thereof, reference may be made to the above related content. After the server acquires the target data and the data read rule corresponding to the target data, content of the target data may be filtered through the data read rule to filter out, from the target data, data content that can be read by a sender of the read request. For example, the data read rule corresponding to the target data may include one or more words that the user is not allowed to read (e.g., a name of a person, a name of an organization or institution, a name of a region, or any other pre-specified words), referred to hereafter as banned words, and/or a statement that the user is not allowed to read, referred to hereafter as banned statements, or the like. The target data may be text data including one or more statements or paragraphs. The server may analyze, based on the data read rule, each statement or paragraph included in the target data respectively to find whether the statement or paragraph includes a banned word and/or banned statement. If it is found that a certain statement or paragraph includes the banned word and/or banned statement, the corresponding statement or paragraph in the target data including the banned word and/or the banned statement may be processed to obtain a processed statement or paragraph. Based on the above method, the above processing may be performed on each statement or paragraph in the target data to obtain one or more processed statements or paragraphs.

There may be a variety of methods for processing the statement or paragraph in the target data including the banned word and/or the banned statement. For example, the banned word or the banned statement included in the statement or paragraph in the target data may be replaced with a specified character, for example, it may be replaced with a character such as "*" or X. In an embodiment, the banned word or the banned statement included in the statement or paragraph in the target data may be covered in a manner such as scribbling. In addition to the above methods, the statement or paragraph may also be processed in many other methods, which may be specifically set according to an actual situation and is not limited in the embodiment of the present specification.

In step S108, the readable content in the target data is provided for a sender of the read request.

In an embodiment, after the target data is processed through the data read rule, the server may obtain data content (readable content) that can be read by the sender of the read request and is filtered out from the target data, then the server may provide the readable content filtered out for the sender, and the sender may read the readable content, so that it can dynamically monitor whether the data provided for the user to read complies with a compliance rule to perform compliance verification again on the data in the blockchain before reading, thereby ensuring that the data read by the user complies with the compliance rule.

Embodiments of the present specification provide a blockchain data processing method. Before target data stored in a blockchain is read, read permission index information of the target data may be acquired from the blockchain, a data read rule corresponding to the target data is acquired based on the read permission index information, and readable content in the target data is determined based on the data read rule in a predetermined trusted environment, so as to ensure the security of content filtering for the target data in the blockchain. Moreover, the contradiction between unchangeability of the data in the blockchain and dynamic change of the data read rule is solved by storing the read permission index information of the target data in the blockchain and storing the corresponding data read rule outside the blockchain, which implements compliance verification on the data stored in the blockchain before reading.

Figure 3:
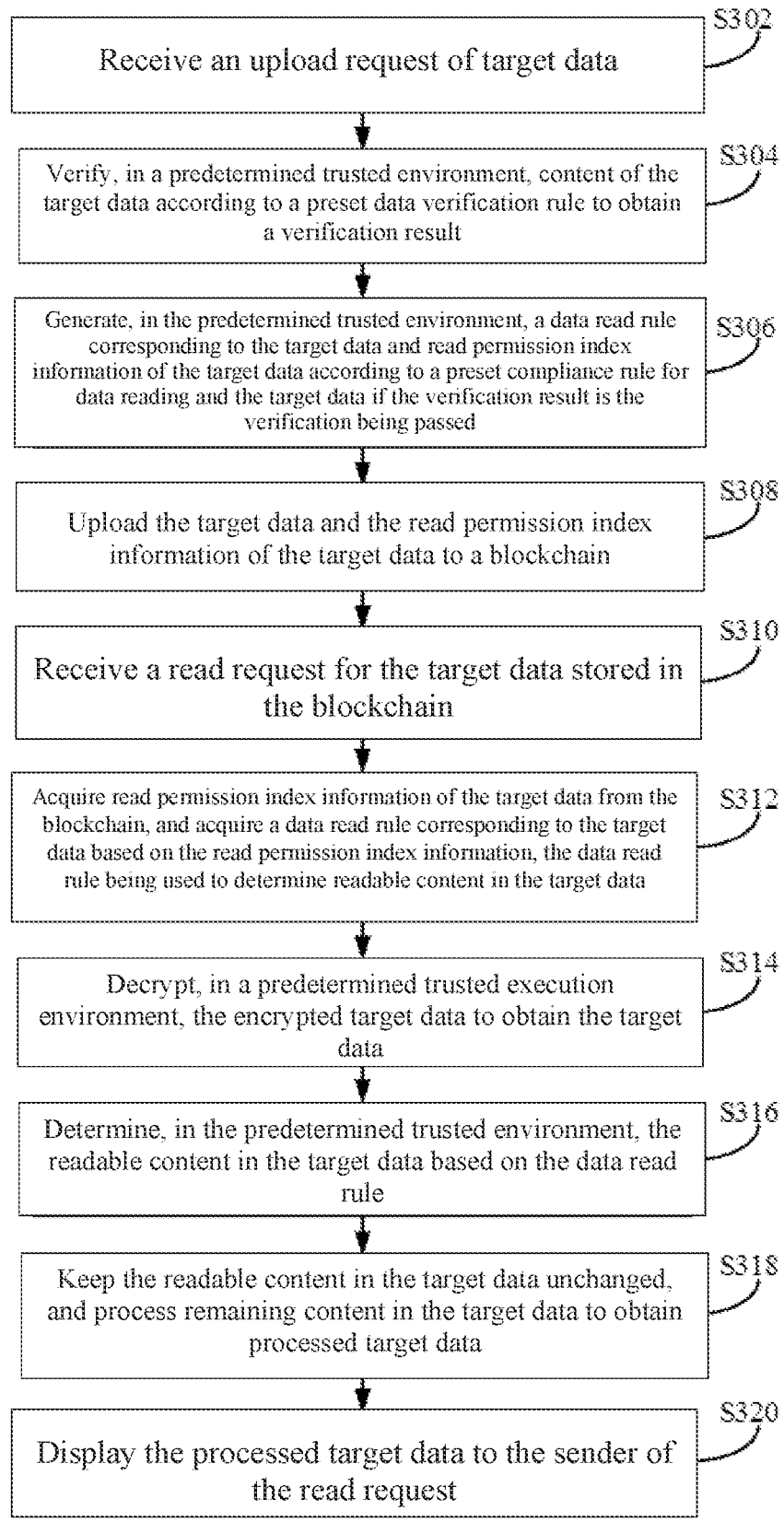
FIG. 3 is a flowchart of a blockchain data processing method according to an embodiment.

FIG. 3 is a flowchart of a blockchain data processing method is provided in an embodiment of the present specification. The method may be executed by a terminal device or a server. The terminal device may be a computer device such as a notebook computer or a desktop computer. The server may be a stand-alone server, or a server cluster formed by a plurality of servers, or the like. The terminal device or server may be a terminal device or server configured to detect whether data that has been uploaded to a blockchain can be read by a user and perform processing. The terminal device or server may be provided with a trusted execution environment. The trusted execution environment may be a Trusted Execution Environment (TEE), and the trusted execution environment may be implemented based on a hardware device, or implemented through a program written in a predetermined programming language (that is, it may be implemented in the form of software). The method being executed by a server is taken as an example in the embodiment of the present specification. In a case where the method is executed by a terminal device, the method may be performed with reference to the following related content, which is not described in detail herein. The method may specifically include the following steps.

In step S302, an upload request of target data is received.

The upload request may include target data, and may also include, for example, an identifier of the target data, relevant information of a holder of the target data, relevant information of an initiator of the upload request, service attribute information of the target data (such as a service type corresponding to the target data and a service identifier corresponding to the target data), and the like, which may be specifically set according to an actual situation and is not limited in the embodiment of the present specification.

In an embodiment, in order to be able to verify credibility of the data (i.e., the target data) uploaded to the blockchain, a server that verifies the credibility of the target data may be preset, and an application program that performs the above verification function may be installed in the server. Correspondingly, an application program that uploads data to the blockchain may also be installed in a terminal device of the user. Through the application program, the user can upload data to the blockchain. To this end, a data uploading entry (specifically, such as a key or a hyperlink for data uploading) may be set in the application program. If the user needs to upload data (i.e., target data) to the blockchain, the target data may be uploaded through the above data uploading entry (specifically, for example, the user may click the key or hyperlink for data uploading, the terminal device may display a data uploading page which includes a data input box and/or a data selection box, and the user may input or select the target data for uploading). Upon completion of the uploading, the terminal device may acquire the target data and may generate an upload request and send the upload request to the server. The server may receive the upload request for the target data.

It should be noted that the above method is implemented by the terminal device directly sending an upload request to the server. In some embodiments, other methods may also be included. For example, the terminal device may send the upload request to a blockchain node, and the blockchain node may send a redirection message to the terminal device. The redirection message may include an access address (such as an IP address) of the server. The terminal device may send the upload request to the server based on the access address in the redirection message. The server may receive the upload request for the target data.

In addition, in order to ensure the security of the uploaded target data, a preset encryption algorithm (such as a symmetric encryption algorithm or an asymmetric encryption algorithm) may be used to encrypt the target data. In this way, the target data in the upload request is the encrypted data. In this case, the target data may also be preprocessed through the following processing, which may specifically include the following content: decrypting, in a predetermined trusted execution environment, the encrypted target data to obtain the target data.

In an embodiment, the terminal device of the user may perform data uploading processing through the application program that uploads data to the blockchain. A data uploading entry may be provided in the application program. If the user needs to upload data (i.e., target data) to the blockchain, the target data may be encrypted through a preset encryption algorithm to obtain encrypted target data. Then, the encrypted target data may be uploaded through the above data uploading entry. Upon completion of the uploading, the terminal device may acquire the encrypted target data, and may generate an upload request and send the upload request to the server. The server may receive the upload request.

In step S304, content of the target data is verified according to a preset data verification rule in a predetermined trusted environment to obtain a verification result.

The data verification rule may be a rule capable of verifying the credibility of a certain piece of data. There may be a variety of data verification rules. For example, if a holder of the target data is a specified organization or institution, the target data is trusted data; or if attribute information of the target data includes specified attribute information, the target data is trusted data, or the like.

In an embodiment, in order to ensure that the data to be uploaded is not leaked, the data to be uploaded may be placed in a trusted execution environment, and then the data to be uploaded may be calculated or processed in the trusted execution environment, which may include: presetting a data verification rule so as to verify the credibility of the data to be uploaded (i.e., the target data). There may be a variety of set data verification rules. For example, corresponding data verification rules may be set for different service categories to which the target data belongs, and different data verification rules may be set for target data of different service categories. For example, a data verification rule meeting requirements of real-name authentication may be set for related data of a real-name authentication service, and a data verification rule meeting payment requirements and payment security requirements may be set for related data of a payment service, and the like. In addition, corresponding data verification rules may be set for different organizations or institutions, so that the data verification rules set for the corresponding organizations or institutions may be used to verify the credibility of target data provided by the organizations or institutions. In some embodiments, the data verification rule not only includes the above two setting methods, but also may include more different setting methods, which may be specifically set according to an actual condition and is not limited in the embodiment of the present specification.

The server, after receiving the upload request, may acquire the target data from the upload request, and may place the target data in the trusted execution environment. In the trusted execution environment, the server may analyze the target data to determine a service category corresponding to the target data, or determine relevant information of an organization or institution corresponding to the target data, and then may acquire, based on the determined service category or the determined relevant information of the organization or institution, the corresponding data verification rule. In the trusted execution environment, the credibility of the target data is verified by using the acquired data verification rule. The credibility of the target data may be verified in a variety of manners. For example, an encrypted label may be preset in trusted data. In this way, the label set in the target data may be decrypted based on the acquired data verification rule in the trusted execution environment to obtain original content of the label, and then validity of the label is validated (for example, it is validated whether the label is within a set valid period, or the like). If a validation result of the label is the label being valid, it may be determined that a verification result for the target data is the target data being trusted. If the validation result of the label is the label being invalid, it may be determined that the verification result for the target data is the target data being untrusted. In addition, if the target data does not include any encrypted label, it may also be determined that the verification result for the target data is the target data being untrusted.

The above processing of verifying the credibility of the target data is only an example. In some embodiments, the credibility of the target data may also be verified in a variety of other processing methods, such as first to third methods in the following.

In the first method, a preset smart contract is called to verify content of the target data in the predetermined trusted environment to obtain a verification result. The smart contract is generated based on the data verification rule and deployed in the blockchain.

The smart contract may be a computer protocol designed to propagate, validate, or enforce contracts in an informationized manner. The smart contract allows trusted service processing without a third party, and the trusted service processing is traceable and irreversible. The smart contract includes a protocol on which contract participants may exercise the rights and obligations agreed to by contract participants. The smart contract may include a trigger condition that triggers the execution of the smart contract, and a result corresponding to the trigger condition. The smart contract may include one or more trigger conditions, and each trigger condition may correspond to a result. For example, if the target data belongs to data of specified institution A, the verification result of the target data is the target data being trusted, the service category of the target data is payment, and the credibility of the target data is verified through preset condition A.

In an embodiment, some organizations or institutions may respectively set one or more different data verification rules for different service types or the like. The organization or institution may create or join a specified blockchain, and a terminal device or server of the organization or institution may act as a blockchain node in the blockchain. In this way, the organization or institution may verify the credibility of target data to be uploaded based on the blockchain node. In order to verify the credibility of the target data to be uploaded, a corresponding application program may be installed in the blockchain node. The application program may be a program for setting a data verification rule and the like. The application program may be provided with an input box and/or a selection box for data verification rules. A marketer may set data verification rules corresponding to different service categories in the input box and/or the selection box described above. Then, the blockchain node may receive information of the data verification rules provided by the organization or institution. The blockchain node may generate a corresponding smart contract based on the information of the set data verification rule, and may deploy the smart contract corresponding to the data verification rule in a blockchain network where the blockchain node is located. In this way, data verification rules and corresponding smart contracts are stored in the blockchain, and other organizations or institutions cannot tamper with the data verification rules and the corresponding smart contracts.

The server, after receiving the upload request, may acquire the target data from the upload request, and may place the target data in the trusted execution environment. In a trusted execution environment, the server may analyze the target data to determine relevant information of the smart contract required to verify the credibility of the target data, and then the server may call the smart contract in the blockchain, through which the credibility of the target data may be verified. For example, content included in the target data may be analyzed, and content related to a trigger condition in the smart contract may be acquired therefrom. The acquired content may be matched or compared with the trigger conditions in the smart contract. If the acquired content can trigger a certain trigger condition in the smart contract, the credibility of the target data may be verified based on a processing mechanism corresponding to the trigger condition to acquire a corresponding verification structure. For a detailed processing process of verifying the credibility of the target data based on the processing mechanism corresponding to the trigger condition, reference to may be made to the above related content. If the acquired content cannot match any trigger condition in the smart contract, it indicates that the credibility of the target data cannot be verified.

In the second method, the validity of a validatable declaration is validated in a predetermined trusted execution environment; and content of the target data is verified according to a validation result to obtain a verification result.

In an embodiment, the server, after receiving the upload request, may acquire the target data and the validatable declaration from the upload request, and may place the target data and the validatable declaration in the trusted execution environment. The trusted execution environment may be a TEE, and the trusted execution environment may be implemented based on a hardware device, or the trusted execution environment may also be implemented through a program written in a predetermined programming language (that is, it may be implemented in the form of software). The server may first validate the validatable declaration to determine whether the validatable declaration is valid. If it is determined that the validatable declaration is valid, corresponding processing is then performed based on the validatable declaration, so as to further ensure the security of data processing. Specifically, the validatable declaration may be validated in a variety of manners. For example, field values included in the validatable declaration may be calculated through a predetermined algorithm (for example, hash values of the field values included in the validatable declaration may be calculated through a hash algorithm, or the like) to obtain a corresponding calculation result. The validatable declaration may further include a benchmark value of the above calculation result. The obtained calculation result may be compared with the benchmark value in the validatable declaration. If the two are the same, the validation is passed, that is, the validatable declaration is valid. If the two are different, the validation fails, that is, the validatable declaration is invalid.

In another embodiment, the validatable declaration may include a check value of the validatable declaration. After the server acquires the validatable declaration, the check value of the validatable declaration may be determined through a predetermined check algorithm. Then, a calculated check value may be compared with the check value in the validatable declaration. If the two are the same, the validation is passed, that is, the validatable declaration is valid. If the two are not the same, the validation fails, that is, the validatable declaration is invalid. In an embodiment, the method for validating the validity of the validatable declaration may be set according to an actual situation and is not limited in the embodiment of the present specification.

Through the above processing, the target data may be determined to be untrusted data when the validation result is the validatable declaration being invalid. In this case, a notification message indicating failure of the uploading may be sent to an initiator of the upload request. If the validation result is that the validatable declaration being valid, the target data may be determined to be data uploaded by a trusted user (or a trusted organization or institution), that is, the target data is trusted data.

There may be a variety of processing methods for verifying the content of the target data according to the validation result to obtain a verification result. An example processing method is provided below, and may include step B2 and step B4.

In step B2, a data verification rule corresponding to a holder of the validatable declaration is acquired in the trusted execution environment if the validation result is the validatable declaration being valid.

In an embodiment, if the validation result is the validatable declaration being valid, it indicates that the target data is data published or provided by the holder of the validatable declaration. In order to further verify the data uploaded to the blockchain by holders of different validatable declarations and ensure the security of the data, data verification rules may be set for the holders of different validatable declarations. In an embodiment, the holders of the validatable declarations may preset the data verification rules for the holders to upload data to prevent other organizations or users from embezzling the validatable declarations of the holders of the validatable declarations to upload false data to the blockchain. A data verification rule corresponding to a holder of the validatable declaration may be acquired in the trusted execution environment after the validatable declaration is determined to be valid.

In step B4, content of the target data is verified according to a data verification rule corresponding to the holder in the predetermined trusted execution environment to obtain a verification result.

In the third method, the upload request includes digital identity information of the initiator of the upload request, and the digital identity information of the initiator is searched for in pre-stored digital identity information in the trusted execution environment; and if the digital identity information is found, content of the target data is verified in the trusted execution environment according to a data verification rule corresponding to the digital identity information of the initiator to obtain a verification result.

The digital identity information may be information that identifiably portrays a user through digital information, that is, real identity information is condensed into a form of digital code, so as to bind, query, and validate real-time behavior information of the user. The digital identity information may not only include birth information, individual description, biological characteristics, and other identity coding information of the user, but also involve personal behavior information with a variety of attributes (such as transaction information or entertainment information). The digital identity information may be displayed in a variety of manners, such as Decentralized Identity (DID).

In an embodiment, corresponding digital identity information may be constructed in the blockchain for different users. For this purpose, digital identity information of the user (such as DID of the user) uploading the data to the blockchain may be preset, and the digital identity information of the user uploading the data to the blockchain may be stored in the trusted execution environment or the digital identity information is encrypted and then stored in the server. After receiving the upload request, the server may search for the digital identity information of the initiator of the upload request in the pre-stored digital identity information in the trusted execution environment. In an embodiment, the encrypted digital identity information may be sent to the trusted execution environment, and the encrypted digital identity information may be decrypted in the trusted execution environment to obtain digital identity information, and then the server finds, from the digital identity information, whether the digital identity information of the initiator of the upload request exists.

In step S306, a data read rule corresponding to the target data and read permission index information of the target data are generated according to a preset compliance rule for data reading and the target data in the predetermined trusted environment if the verification result is the verification being passed.

The compliance rule for data reading may be a rule verifying that a certain piece of data can be read by a user. The compliance rule for data reading may be a compliance rule established based on data capable of being read by users or not allowed to be read set by a specified organization or institution. The organization or institution may be an organization or institution that establishes the compliance rule or a country or region, or the like. There may be a variety of compliance rules for data reading. For example, an organization or department in a certain country has set a plurality of words that users are not allowed to read. A compliance rule for data reading may be determined based on the plurality of set words. The trusted execution environment may be a TEE. The trusted execution environment may be implemented by a specified hardware device, or the trusted execution environment may also be implemented by a program written in a predetermined programming language (that is, it may be implemented in the form of software), and the trusted execution environment may be a data processing environment that is safe and isolated from other environments. Processing executed in the trusted execution environment, data generated in a data processing process, and the like cannot be known to any party outside the trusted execution environment.

In an embodiment, in order to ensure that the target data in the blockchain is not leaked, the target data may be placed in a trusted execution environment, and then the target data may be calculated or processed in the trusted execution environment, which may include: presetting a compliance rule for data reading so as to determine readable content in the target data. There may be a variety of set compliance rules for data reading. For example, corresponding compliance rules for data reading may be set for different service categories to which the target data belongs, and different compliance rules for data reading may be set for target data of different service categories. In addition, corresponding compliance rules for data reading may be set for different organizations or institutions, so that the compliance rules for data reading set for the corresponding organizations or institutions may be used to determine readable content in target data provided by the organizations or institutions. In an embodiment, the compliance rule for data reading not only includes the above setting methods, but also may include more different setting methods, which may be set according to an actual condition and is not limited in the embodiment of the present specification.

If the verification result is the verification being passed, it indicates that the target data is trusted data. In this case, a corresponding data read rule and read permission index information may be generated for the target data. In the trusted execution environment, the server may analyze the target data to determine a service category corresponding to the target data, or determine relevant information of an organization or institution corresponding to the target data, or the like and then may acquire, based on the determined service category or the determined relevant information of the organization or institution, the corresponding compliance rule for data reading. The data read rule corresponding to the target data and the read permission index information of the target data may be generated in the trusted execution environment by using the acquired compliance rule for data reading and the target data.

In step S308, the target data and the read permission index information of the target data are uploaded to a blockchain.

In an embodiment, there is no need to verify the content of the target data according to the preset data verification rule, but the processing of generating, in the predetermined trusted environment, the data read rule corresponding to the target data and the read permission index information of the target data according to the preset compliance rule for data reading and the target data may be directly executed after step S302, which may be set according to an actual situation and is not limited in the embodiment of the present specification.

By uploading the target data and the read permission index information of the target data to the blockchain in the above manner, the data read rule corresponding to the target data may be stored in the server, or may also be stored in a specified database, so that compliance verification can be performed on reading of the target data subsequently, as described below.

In step S310, a read request for target data stored in the blockchain is received.

In step S312, read permission index information of the target data is acquired from the blockchain, and a data read rule corresponding to the target data is acquired based on the read permission index information, the data read rule being used to determine readable content in the target data.

In an embodiment, in order to determine the readable content of the target data more flexibly, and considering that the compliance rule for data reading or the data read rule may often change, the data read rule may also be modified, e.g., using the first or second methods below.

In the first method, a changed compliance rule is acquired when it is detected that the compliance rule for data reading is changed; and the data read rule is modified based on the changed compliance rule to obtain a modified data read rule.

In an embodiment, the data read rule may include a variety of different content. In some embodiments, a model configured to filter data is set in the data read rule according to an actual situation, such as a classification model. The model may be acquired through a relatively complex program written in a predetermined programming language, or through a relatively simple algorithm, which is not limited in the embodiment of the present specification. Since the data read rule is determined based on the compliance rule for data reading, the modification to the data read rule may be triggered by detecting a change in the compliance rule for data reading. For example, a detection cycle of the compliance rule may be preset, and each time the detection cycle is reached, it is detected whether the compliance rule for data reading is changed. For example, it is determined, by comparing the compliance rule with a compliance rule for data reading in a previous cycle, whether the compliance rule for data reading is changed. A changed compliance rule is acquired when it is detected that the compliance rule for data reading is changed, and then the data read rule may be modified based on the changed compliance rule to obtain a modified data read rule. For example, if two banned words are added to the changed compliance rule, the data read rule is correspondingly modified based on the added banned words to obtain a modified data read rule.

There may be a variety of methods for triggering the modification to the data read rule, which may be set according to an actual situation and is not limited in the embodiment of the present specification.

In the second method, a modify request for a data read rule corresponding to the target data is received; and the data read rule corresponding to the target data is modified based on the modify request to obtain a modified data read rule.

In an embodiment, in order to prevent irrelevant users from modifying the data read rule, relevant information of a user having a modification permission (such as a user initially setting or creating the data read rule or a pre-specified user) may also be set for the data read rule, that is, only a user having a modification permission can modify the data read rule. When the data read rule needs to be modified, the user may input, through a corresponding application program installed in the terminal device thereof, an identifier of the data read rule needing to be modified and information needing to be modified. Upon completion of the input, the terminal device may acquire the identifier of the data read rule needing to be modified and the information needing to be modified that are input, may generate a modify request, and may send the modify request to the server. The server may receive the modify request for the data read rule.

The server, after receiving the modify request for the data read rule, may acquire the identifier of the data read rule included in the modify request, and may find the corresponding data read rule through the identifier. The information of the user having a permission to modify the data read rule may be acquired. It is searched for, from the acquired information of the user having a modification permission, whether information of an initiator of a current modify request is included. If yes, it may be determined that the initiator of the current modify request has a permission to modify the data read rule. In this case, the server may modify the data read rule in the trusted execution environment based on the above modify request to obtain a modified data read rule. If no, it may be determined that the initiator of the current modify request does not have any permission to modify the data read rule. In this case, the server may send a notification message indicating failure of the modification to the initiator of the current modify request.

In addition, the above target data may be encrypted data, and the target data may also be processed in the following method, which may include the following processing in step S314.

In step S314, the encrypted target data is decrypted in a predetermined trusted execution environment to obtain the target data.

In step S316, the readable content in the target data is determined based on the data read rule in the predetermined trusted environment.

In an embodiment, for the above modified data read rule, the modified data read rule may be used to determine readable content in the target data, and step S316 may include: determining, in a predetermined trusted execution environment, readable content in the target data based on the modified data read rule. For a detailed processing process, reference may be made to the above related content.

In step S318, the readable content in the target data is kept unchanged, and remaining content in the target data is processed to obtain processed target data.

In an embodiment, after the server determines the readable content in the target data through the data read rule, the readable content included therein may be obtained. For the readable content, positions and content in the target data may be kept unchanged, and remaining content in the target data except the readable content may be processed. For example, each character in the remaining content may be replaced with a specified character (such as "*" or "&"), and processed target data may be finally acquired.

In step S320, the processed target data is displayed to the sender of the read request.

Embodiments of the present specification provide a blockchain data processing method. Before target data stored in a blockchain is read, read permission index information of the target data may be acquired from the blockchain, a data read rule corresponding to the target data is acquired based on the read permission index information, and readable content in the target data is determined based on the data read rule in a predetermined trusted environment, so as to ensure the security of content filtering for the target data in the blockchain. Moreover, the contradiction between unchangeability of the data in the blockchain and dynamic change of the data read rule is solved by storing the read permission index information of the target data in the blockchain and storing the corresponding data read rule outside the blockchain, which implements compliance verification on the data stored in the blockchain before reading.

Figure 4:
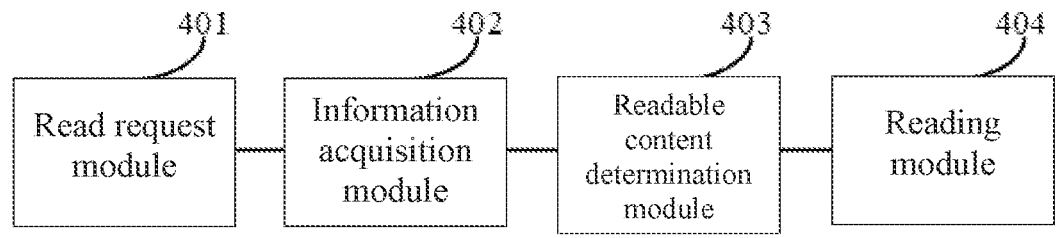
FIG. 4 is a flowchart of a blockchain data processing apparatus according to an embodiment.

FIG. 4 is a schematic diagram of a blockchain data processing apparatus according to an embodiment. As shown in FIG. 4, the blockchain data processing apparatus includes: a read request module 401, an information acquisition module 402, a readable content determination module 403, and a reading module 404.

The read request module 401 is configured to receive a read request for target data stored in a blockchain.

The information acquisition module 402 is configured to acquire read permission index information of the target data from the blockchain, and acquire a data read rule corresponding to the target data based on the read permission index information, the data read rule being configured to determine readable content in the target data.

The readable content determination module 403 is configured to determine, in a predetermined trusted environment, the readable content in the target data based on the data read rule.

The reading module 404 is configured to provide the readable content in the target data for a sender of the read request.

In an embodiment, the reading module 404 includes: a content processing unit configured to keep the readable content in the target data unchanged, and process remaining content in the target data to obtain processed target data; and a display unit configured to display the processed target data to the sender of the read request.

In an embodiment, the apparatus further includes: an upload request module configured to receive an upload request of the target data; a rule generation module configured to generate, in the predetermined trusted environment, the data read rule corresponding to the target data and the read permission index information of the target data according to a preset compliance rule for data reading and the target data; and an information uploading module configure to upload the target data and the read permission index information of the target data to the blockchain.

In an embodiment, the apparatus further includes: a rule change detection module configured to acquire a changed compliance rule when it is detected that the compliance rule for data reading is changed; a rule modification module configured to modify the data read rule based on the changed compliance rule to obtain a modified data read rule; and the readable content determination module 403 configured to determine, in the predetermined trusted environment, the readable content in the target data based on the modified data read rule.

In an embodiment, the rule generation module includes: a verification unit configured to verify, in the predetermined trusted environment, content of the target data according to a preset data verification rule to obtain a verification result; and a rule generation unit configured to generate, in the predetermined trusted environment, the data read rule corresponding to the target data and the read permission index information of the target data according to the preset compliance rule for data reading and the target data if the verification result is the verification being passed.

In an embodiment, the apparatus further includes: a modify request module configured to receive a modify request for the data read rule corresponding to the target data; a rule modification module configured to modify, based on the modify request, the data read rule corresponding to the target data to obtain a modified data read rule; and the readable content determination module 403 configured to determine, in the predetermined trusted environment, the readable content in the target data based on the modified data read rule.

In an embodiment, the target data is encrypted data, and the apparatus further includes: a decryption module configured to decrypt, in a predetermined trusted execution environment, the encrypted target data to obtain the target data.

Embodiments of the present specification provide a blockchain data processing apparatus. Before target data stored in a blockchain is read, read permission index information of the target data may be acquired from the blockchain, a data read rule corresponding to the target data is acquired based on the read permission index information, and readable content in the target data is determined based on the data read rule in a predetermined trusted environment, so as to ensure the security of content filtering for the target data in the blockchain. Moreover, the contradiction between unchangeability of the data in the blockchain and dynamic change of the data read rule is solved by storing the read permission index information of the target data in the blockchain and storing the corresponding data read rule outside the blockchain, which implements compliance verification on the data stored in the blockchain before reading.

Figure 5:
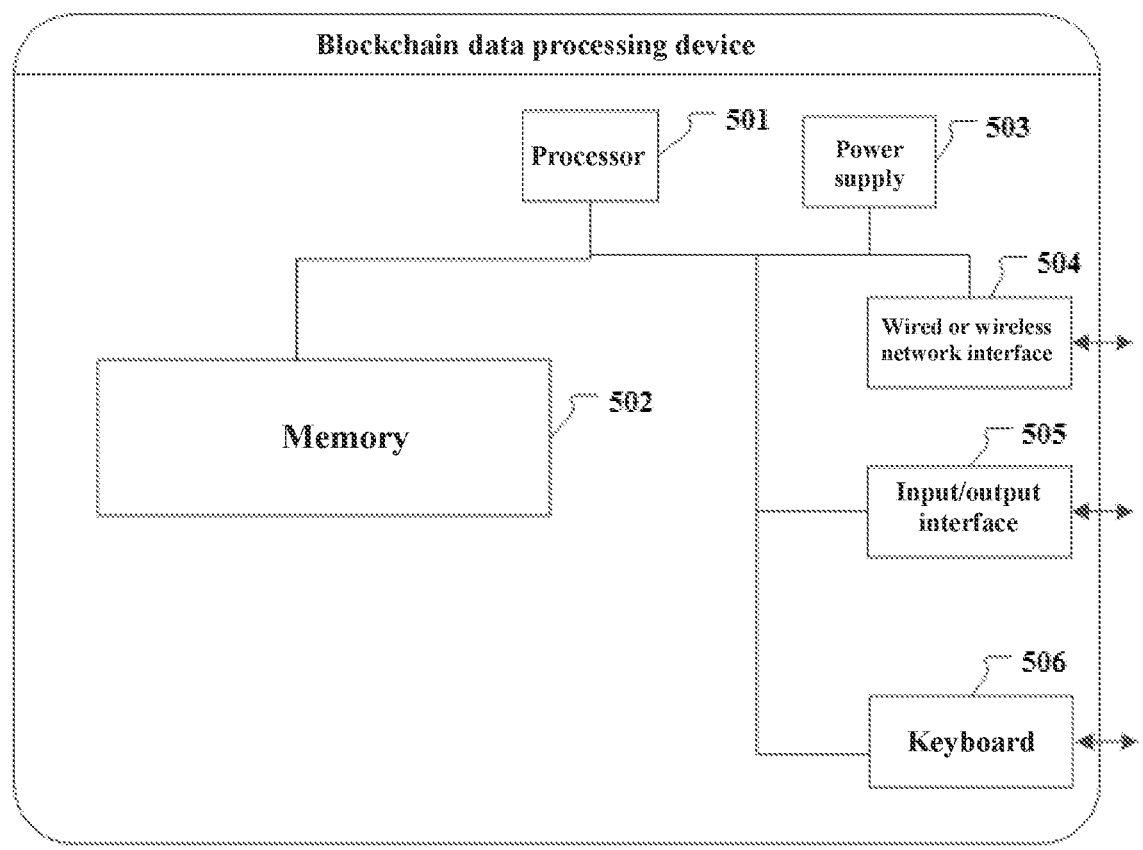
FIG. 5 is a schematic diagram of a blockchain data processing device according to an embodiment.

FIG. 5 is a schematic diagram of a blockchain data processing device according to an embodiment. As shown in FIG. 5, the blockchain data processing device may be any of the above terminal device or server. The terminal device or server may be configured to detect whether the data that has been uploaded to the blockchain can be read by a user and perform processing. The terminal device or server may be provided with a trusted execution environment. The trusted execution environment may be a Trusted Execution Environment (TEE), and the trusted execution environment may be implemented based on a hardware device, or implemented through a program written in a predetermined programming language (that is, it may be implemented in the form of software).

The blockchain data processing device may differ greatly depending on different configurations or performance, and may include one or more processors 501 and memory 502. The memory 502 may store one or more storage application programs or data. The memory 502 may be non-transitory storage or persistent storage. The application program(s) stored in the memory 502 may include one or more modules (not shown), and each module may include a series of computer-executable instructions in the blockchain data processing device. Furthermore, the processor 501 may be configured to communicate with the memory 502, and execute, on the blockchain data processing device, the series of computer-executable instructions in the memory 502. The blockchain data processing device may further include one or more power supplies 503, one or more wired or wireless network interfaces 504, one or more input/output interfaces 505, and one or more keyboards 506.

In this embodiment, the blockchain data processing device includes a memory and one or more programs. The one or more programs are stored in the memory, and may include one or one modules. Each module may include a series of computer-executable instructions in the blockchain data processing device, and is configured to execute, by the one or more processors, the one or more programs for performing the above blockchain data processing method including, e.g., receiving a read request for target data stored in a blockchain; acquiring read permission index information of the target data from the blockchain, and acquiring a data read rule corresponding to the target data based on the read permission index information, the data read rule being configured to determine readable content in the target data; determining, in a predetermined trusted environment, the readable content in the target data based on the data read rule; and providing the readable content in the target data for a sender of the read request.

In an embodiment, the providing the readable content in the target data for a sender of the read request includes: keeping the readable content in the target data unchanged, and processing remaining content in the target data to obtain processed target data; and displaying the processed target data to the sender of the read request.

In an embodiment, the device further performs: receiving an upload request of the target data; generating, in the predetermined trusted environment, the data read rule corresponding to the target data and the read permission index information of the target data according to a preset compliance rule for data reading and the target data; and uploading the target data and the read permission index information of the target data to the blockchain.

In an embodiment, the device further performs: acquiring a changed compliance rule when it is detected that the compliance rule for data reading is changed; modifying the data read rule based on the changed compliance rule to obtain a modified data read rule; and the determining, in a predetermined trusted environment, the readable content in the target data based on the data read rule includes: determining, in the predetermined trusted environment, the readable content in the target data based on the modified data read rule.

In an embodiment, the generating, in the predetermined trusted environment, the data read rule corresponding to the target data and the read permission index information of the target data according to a preset compliance rule for data reading and the target data includes: verifying, in the predetermined trusted environment, content of the target data according to a preset data verification rule to obtain a verification result; and generating, in the predetermined trusted environment, the data read rule corresponding to the target data and the read permission index information of the target data according to the preset compliance rule for data reading and the target data if the verification result is the verification being passed.

In an embodiment, the device further performs: receiving a modify request for the data read rule corresponding to the target data; modifying, based on the modify request, the data read rule corresponding to the target data to obtain a modified data read rule; and the determining, in a predetermined trusted environment, the readable content in the target data based on the data read rule includes: determining, in the predetermined trusted environment, the readable content in the target data based on the modified data read rule.

In an embodiment, the target data is encrypted data, and before the determining, in a predetermined trusted environment, the readable content in the target data based on the data read rule, the device further performs: decrypting, in a predetermined trusted execution environment, the encrypted target data to obtain the target data.

Embodiments of the present specification provide a blockchain data processing device. Before target data stored in a blockchain is read, read permission index information of the target data may be acquired from the blockchain, a data read rule corresponding to the target data is acquired based on the read permission index information, and readable content in the target data is determined based on the data read rule in a predetermined trusted environment, so as to ensure the security of content filtering for the target data in the blockchain. Moreover, the contradiction between unchangeability of the data in the blockchain and dynamic change of the data read rule is solved by storing the read permission index information of the target data in the blockchain and storing the corresponding data read rule outside the blockchain, which implements compliance verification on the data stored in the blockchain before reading.

The foregoing describes example embodiments of the present specification. Other embodiments may fall within the scope of the appended claims. In some cases, the actions or steps described above may be performed in a different sequence and an expected result may still be achieved. In addition, the processes depicted in the accompanying drawings do not necessarily require specific sequences or consecutive sequences to achieve an expected result. In some implementations, multitasking and parallel processing may be feasible or beneficial.

With the development of technologies, nowadays, the improvement to many method flows can be implemented as a direct improvement to a hardware circuit structure. Designers program improved method flows into hardware circuits to acquire corresponding hardware circuit structures. Therefore, it cannot be said that an improvement to a method flow cannot be implemented by a hardware entity module. For example, a Programmable Logic Device (PLD) (e.g., a Field Programmable Gate Array (FPGA)) is such an integrated circuit, and its logic functions are determined by a user through programming the device. Designers "integrate" a digital system onto a piece of PLD by independent programming without asking a chip manufacturer to design and manufacture a dedicated integrated circuit chip. Moreover, at present, instead of manually making an integrated circuit chip, this programming is also implemented mostly using "logic compiler" software, which is similar to a software compiler used for program development and compilation. However, the original code before compilation also has to be compiled using a specific programming language, which is known as a Hardware Description Language (HDL). There is not only one, but many kinds of HDLs, such as ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, and RHDL (Ruby Hardware Description Language). At present, VHDL (Very-High-Speed Integrated Circuit Hardware Description Language) and Verilog are the most commonly used. Those skilled in the art should also know that a hardware circuit for implementing a logic method flow can be easily acquired by slightly logically programming the method flow using the above several hardware description languages and programming it into an integrated circuit.

In some embodiments, a controller may be used to implement the above methods. For example, the controller may be in the form of a microprocessor or processor and a computer-readable medium storing computer-readable program code (such as software or firmware) executable by this (micro)processor, a logic gate, a switch, an Application Specific Integrated Circuit (ASIC), a programmable logic controller, and an embedded microcontroller. Examples of the controller include, but are not limited to, the following microcontrollers: ARC 625D, Atmel AT91SAM, Microchip PIC18F26K20, and Silicone Labs C8051F320. A controller of a memory may also be implemented as part of the control logic of the memory. Those skilled in the art also know that, in addition to implementing a controller in the form of pure computer-readable program code, the method steps can be logically programmed to enable the controller to realize the same function in the form of logic gates, switches, special integrated circuits, programmable logic controllers, embedded microcontrollers, or the like.

The systems, apparatuses, modules, or devices in the above embodiments may be implemented by a computer chip or entity, or by a product with a certain function. A typical implementation device is a computer. For example, the computer can be a personal computer, a laptop computer, a cellular phone, a camera phone, a smart phone, a personal digital assistant, a media player, a navigation device, an email device, a game console, a tablet computer, a wearable device, or a combination of any of these devices.

The embodiments are described with reference to flowcharts and/or block diagrams. It should be understood that each flow and/or block in the flowcharts and/or block diagrams and a combination of flows and/or blocks in the flowcharts and/or block diagrams may be implemented by computer program instructions. These computer program instructions can be provided to a processor of a general-purpose computer, a special-purpose computer, an embedded processor, or another programmable blockchain data processing device to produce a machine, so that the instructions executed by the processor of the computer or another programmable blockchain data processing device produce an apparatus for realizing the functions specified in one or more flows of the flowcharts and/or one or more blocks of the block diagrams.

These computer program instructions may also be stored in a computer-readable medium that can direct a computer or another programmable blockchain data processing device to work in a specific manner, so that the instructions stored in this computer-readable medium produce an article of manufacture including an instruction apparatus which implements the functions specified in one or more flows of the flowcharts and/or one or more blocks of the block diagrams.

These computer program instructions can also be loaded onto a computer or another programmable blockchain data processing device, so that a series of operation steps are performed on the computer or another programmable device to produce computer-implemented processing, so that the instructions executed on the computer or another programmable device provide steps for implementing the functions specified in one or more flows of the flowcharts and/or one or more blocks of the block diagrams.

The computer-readable medium includes permanent and non-permanent, removable and non-removable media, which may implement storage of information by using any method or technology. The information may be computer-readable instructions, data structures, modules of programs, or other data. Examples of computer storage media include, but are not limited to, a phase change memory (PRAM), a static random access memory (SRAM), a dynamic random access memory (DRAM), other types of random access memories (RAM), read-only memories (ROM), electrically erasable programmable read-only memories (EEPROM), flash memories or other memory technologies, read-only compact disc read-only memories (CD-ROM), digital versatile disks (DVD) or other optical storage, magnetic tape cassettes, magnetic tape magnetic disk storage or other magnetic storage devices, or any other non-transmission media, and the computer storage media can be used to store information that can be accessed by computing devices. As defined herein, the computer-readable medium does not include transitory computer readable media (transitory media), such as a modulated data signal and a carrier.

One or more embodiments of the present specification may be implemented using computer-executable instructions executed by a computer, such as a program module. Generally, the program module includes a routine, a program, an object, an assembly, a data structure, and the like used for executing a specific task or implementing a specific abstract data type. One or more embodiments of the present specification may also be practiced in distributed computing environments in which tasks are performed by remote processing devices connected through a communication network. In the distributed computing environments, the program module may be located in local and remote computer storage media including a storage device.

The foregoing descriptions are merely example embodiments of the present specification and are not intended to limit the present specification. For those skilled in the art, the present specification may have various alterations and changes. Any modification, equivalent replacement, improvement, and the like made within the spirit and principle of the present specification shall be included in the scope of the claims.

The invention claimed is:

1. A blockchain data processing method, comprising:
receiving an upload request of target data;
generating, in a predetermined trusted environment, a data read rule corresponding to the target data and read permission index information of the target data according to a preset compliance rule for data reading and the target data;
uploading the target data and the read permission index information of the target data to a blockchain;
receiving a read request for the target data stored in the blockchain;
acquiring the read permission index information of the target data from the blockchain, and acquiring the data read rule corresponding to the target data based on the read permission index information, the data read rule being configured to determine readable content in the target data;
determining, in the predetermined trusted environment, the readable content in the target data based on the data read rule; and
providing the readable content in the target data for a sender of the read request.

2. The method according to claim 1, wherein the providing the readable content in the target data for the sender of the read request comprises:
keeping the readable content in the target data unchanged, and processing remaining content in the target data to obtain processed target data; and
displaying the processed target data to the sender of the read request.

3. The method according to claim 1, further comprising:
acquiring a changed compliance rule when it is detected that the compliance rule for data reading is changed;
modifying the data read rule based on the changed compliance rule to obtain a modified data read rule; and
the determining, in the predetermined trusted environment, the readable content in the target data based on the data read rule comprising:
determining, in the predetermined trusted environment, the readable content in the target data based on the modified data read rule.

4. The method according to claim 1, wherein the generating, in the predetermined trusted environment, the data read rule corresponding to the target data and the read permission index information of the target data according to the preset compliance rule for data reading and the target data comprises:
verifying, in the predetermined trusted environment, content of the target data according to a preset data verification rule to obtain a verification result; and
generating, in the predetermined trusted environment, the data read rule corresponding to the target data and the read permission index information of the target data according to the preset compliance rule for data reading and the target data if the verification result is the verification being passed.

5. The method according to claim 1, further comprising:
receiving a modify request for the data read rule corresponding to the target data;
modifying, based on the modify request, the data read rule corresponding to the target data to obtain a modified data read rule; and
the determining, in the predetermined trusted environment, the readable content in the target data based on the data read rule comprising:
determining, in the predetermined trusted environment, the readable content in the target data based on the modified data read rule.

6. The method according to claim 1, wherein the target data is encrypted data, and before the determining, in the predetermined trusted environment, the readable content in the target data based on the data read rule, the method further comprises:
decrypting, in a predetermined trusted execution environment, the encrypted target data to obtain the target data.

7. A blockchain data processing device, comprising:
a processor; and
a memory storing instructions executable by the processor,
wherein the processor is configured to:
receive an upload request of target data;
generate, in a predetermined trusted environment, a data read rule corresponding to the target data and read permission index information of the target data according to a preset compliance rule for data reading and the target data;
upload the target data and the read permission index information of the target data to a blockchain;
receive a read request for the target data stored in the blockchain;
acquire the read permission index information of the target data from the blockchain, and acquire the data read rule corresponding to the target data based on the read permission index information, the data read rule being configured to determine readable content in the target data;
determine, in the predetermined trusted environment, the readable content in the target data based on the data read rule; and
provide the readable content in the target data for a sender of the read request.

8. The device according to claim 7, wherein the processor is further configured to:
keep the readable content in the target data unchanged, and process remaining content in the target data to obtain processed target data; and
display the processed target data to the sender of the read request.

9. The device according to claim 7, wherein the processor is further configured to:
acquire a changed compliance rule when it is detected that the compliance rule for data reading is changed;
modify the data read rule based on the changed compliance rule to obtain a modified data read rule; and
determine, in the predetermined trusted environment, the readable content in the target data based on the modified data read rule.

10. The device according to claim 7, wherein the processor is further configured to:
verify, in the predetermined trusted environment, content of the target data according to a preset data verification rule to obtain a verification result; and
generate, in the predetermined trusted environment, the data read rule corresponding to the target data and the read permission index information of the target data according to the preset compliance rule for data reading and the target data if the verification result is the verification being passed.

11. The device according to claim 7, wherein the processor is further configured to:
receive a modify request for the data read rule corresponding to the target data;
modify, based on the modify request, the data read rule corresponding to the target data to obtain a modified data read rule; and
determine, in the predetermined trusted environment, the readable content in the target data based on the modified data read rule.

12. The device according to claim 7, wherein the target data is encrypted data, and before determining, in the predetermined trusted environment, the readable content in the target data based on the data read rule, the processor is further configured to:
decrypt, in a predetermined trusted execution environment, the encrypted target data to obtain the target data.

13. A non-transitory computer-readable storage medium having stored therein instructions that, when executed by a processor of a device, cause the device to perform a blockchain data processing method, the method comprising:
receiving an upload request of target data;
generating, in a predetermined trusted environment, a data read rule corresponding to the target data and read permission index information of the target data according to a preset compliance rule for data reading and the target data;
uploading the target data and the read permission index information of the target data to a blockchain;
receiving a read request for the target data stored in the blockchain;
acquiring the read permission index information of the target data from the blockchain, and acquiring the data read rule corresponding to the target data based on the read permission index information, the data read rule being configured to determine readable content in the target data;
determining, in the predetermined trusted environment, the readable content in the target data based on the data read rule; and
providing the readable content in the target data for a sender of the read request.

* * * * *